United States Patent [19]

Lin

[11] 4,355,221
[45] Oct. 19, 1982

[54] METHOD OF FIELD ANNEALING AN AMORPHOUS METAL CORE BY MEANS OF INDUCTION HEATING

[75] Inventor: Kou C. Lin, Hermitage, Pa.

[73] Assignee: Electric Power Research Institute, Inc., Palo Alto, Calif.

[21] Appl. No.: 255,753

[22] Filed: Apr. 20, 1981

[51] Int. Cl.³ .......................... H05B 6/40; C21D 1/04
[52] U.S. Cl. ............................ 219/10.43; 219/10.57; 219/10.75; 148/108; 148/121; 148/154; 29/609
[58] Field of Search .............. 219/10.41, 10.43, 10.57, 219/10.75, 10.49 R, 10.77, 10.79; 148/108, 121, 150, 154; 29/609, 605, 602 R

[56] References Cited

U.S. PATENT DOCUMENTS

| | | | |
|---|---|---|---|
| 2,002,696 | 5/1935 | Kelsall | 148/108 |
| 2,688,573 | 9/1954 | Lee et al. | 148/121 |
| 4,116,728 | 9/1978 | Becker et al. | 148/108 |
| 4,236,230 | 11/1980 | Thompson | 148/108 X |
| 4,281,234 | 7/1981 | Dohogne | 219/10.43 |

Primary Examiner—B. A. Reynolds
Assistant Examiner—Philip H. Leung
Attorney, Agent, or Firm—Flehr, Hohbach, Test, Albritton & Herbert

[57] ABSTRACT

A magnetic core is disclosed herein along with associated electrical coils which together with the core form part of an overall electrical inductive apparatus such as a transformer. The core itself is one which is initially formed from a continuous strip of amorphous metal wound about itself to form a closed loop of adjacent laminations. Thereafter but before the core is annealed causing it to lose its ductility and flexibility, one section thereof is provided with a joint which is flexed open to receive the electrical coils. Once the coils have been suitably assembled around the core, the latter is annealed by means of induction heating. More specifically, one of the coils is energized at a relatively high frequency for inducing a current through the core sufficient to heat the latter to satisfactory annealing temperatures for a prescribed period of time.

7 Claims, 3 Drawing Figures

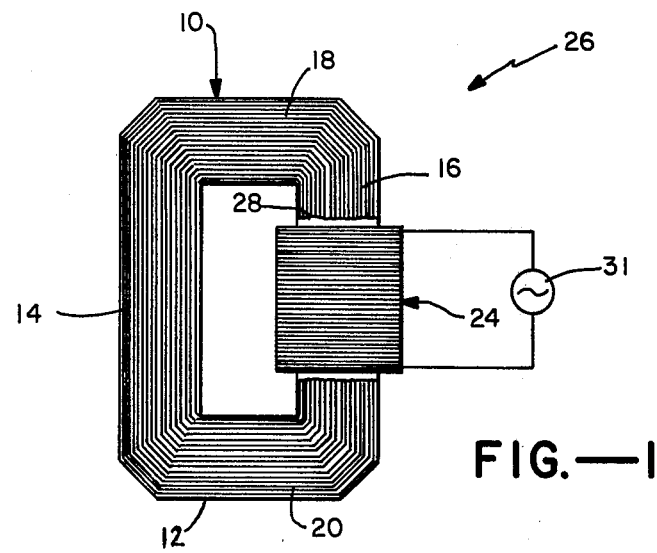
FIG.—1
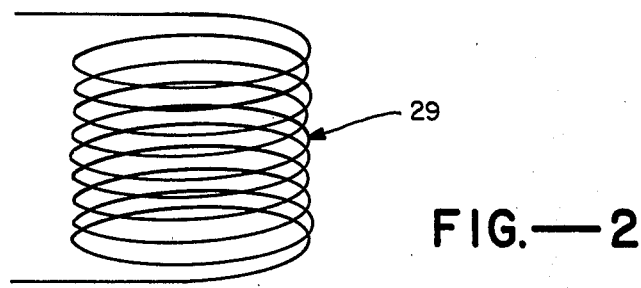
FIG.—2
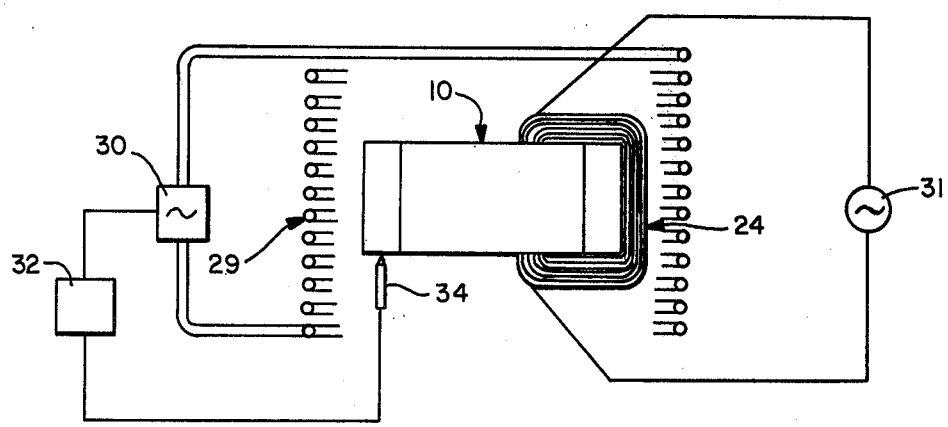
FIG.—3

METHOD OF FIELD ANNEALING AN AMORPHOUS METAL CORE BY MEANS OF INDUCTION HEATING

The present invention relates generally to an electrical inductive apparatus such as a transformer which includes a magnetic core initially wound from a continuous strip of amorphous metal to form a closed loop to adjacent laminations and more particularly to a specific techniques for field annealing the core after one or more associated electrical coils have been assembled around the core.

One common way to make a magnetic core for use in an electrical apparatus such as a transformer is to use magnetic strip material having a preferred direction of orientation parallel to the longitudinal dimension of the material, e.g., non-amorphous material. This material is relatively flexible and easy to form into the ultimate shape of the core both before and after it is stress relief annealed. As a result of this continued flexibility, an associated electrical coil or coils can be readily assembled around the core after annealing the latter by merely providing the core with a joint which is flexed open to receive the coils. However, this assembly procedure is not satisfactory if the core is made from amorphous metal strip material. Specifically, although this latter material once annealed has lower core loss characteristics than annealed non-amorphous material, stress relief annealing amorphous material results in a reduction in its ductility and flexibility, thereby leaving it relatively brittle. This, in turn, makes it more difficult to handle a core or to flex open its joint for assembling an associated coil or coils without chipping or otherwise breaking the core laminations at the joint, without creating undesirable external stresses in the individual laminations and/or otherwise damaging the core.

One previously suggested method to overcome this latter assembly problem is to preassemble the coils to the core before the latter is annealed and becomes brittle and inflexible. However, a satisfactory annealing process requires that the core be heated at a relatively high temperature for a relatively long period of time. For example, the annealing conditions for time and temperature recommended by the Allied Chemical Corporation for METGLAS (a registered trademark for their amorphous metal alloy 2605SC) are two hours of heating at 365° C. in argon, a vacuum or dry nitrogen. However, the coils which are typically copper or aluminum are at the same time subjected to the same prolonged heat which can cause damage to their insulation. The annealing temperature can be different if other amorphous metal alloy is used.

In view of the foregoing, one object of the present invention is to eliminate the problems associated with assembling the previously recited electrical coils around a magnetic core, notwithstanding the fact that the core is constructed of amorphous strip metal and requires field annealing in order to optimize its magnetic characteristics.

A more specific object of the present invention is to anneal the amorphous core after its associated electrical windings have been assembled thereto but without damaging the insulation around the coils.

As will be seen hereinafter, the amorphous metal core to be annealed is assembled with its associated coil or coils and thereafter annealed with an alternating current sufficient to induce current through the core. The alternating current is supplied from the inductor coils (the primary), which surround the transformer coil/core assembly (the secondary) to induce current at the core and coils with electromagnetic forces. The flow of current through the core and coils results in heating the core and coils due to $I^2R$ (I, current, R resistance of the material).

Since resistivity is 1.724 microhms for copper, 2.688 microhms for aluminum, and 125 microhms for the 2605SC METGLAS material, an amorphous metal core will be heated faster and to higher temperatures than the coils (resistivity ratio of the METGLAS material to the conductor material is 72 to 1 for copper, and 46 to 1 for aluminum). The coils are thermally insulated from the core 50 as to minimize the possibility of damage to the coil insulation and the possibility of softening the coils. One of the coils can be used to generate the magnetic field by applying a separate current. A magnetic field is needed during annealing for amorphous metal to develop a magnetic anisotropy.

This overall technique which is provided in accordance with the present invention will be described in more detail hereinafter in conjunction wth the single sheet of drawings wherein:

FIG. 1 is a side elevation view illustrating a core/coil assembly including a wound amorphous metal core for use in an electrical inductive apparatus such as a transformer and an electrical coil assembled thereto;

FIG. 2 is a perspective view of an induction coil for use in heating the core/coil assembly of FIG. 1 by means of induction heating; and FIG. 3 diagrammatically illustrates the induction coil of FIG. 2 in position around the core/coil assembly of FIG. 1 along with means for exciting the induction coil and means for monitoring the temperature of the amorphous metal core.

Turning now to the drawings, attention is first directed to FIG. 1 which shows a magnetic core 10 for use in an electrical inductive apparatus such as a transformer or the like. Core 10 is formed from a continuous strip of amorphous metal wound about itself to form adjacent laminations 12 in the shape of a closed-loop. One example of amorphous strip material making up the core is METGLAS amorphous strip material manufactured by Allied Chemical Company, for example the previously mentioned METGLAS 2605SC amorphous metal. The core can be round, rectangular or of any other suitable closed-loop shape. In the rectangular shape shown, the core includes opposite legs 14 and 16, an upper yoke 18 and a lower yoke 20. For purposes of assembly, the core may be provided with a joint (not shown) or it may be provided without one.

In the specific embodiment illustrated in FIG. 1, core 10 is assembled with a single electrical coil 24 which is typically copper or aluminun and which is coated with electrical insulation, for example polyamide-imide coating. This coil together with the core form a core/coil assembly 26. While only one coil is shown, the actual, preferred assembly will use two coils consisting of high and low voltage coils wound in a concentric loop. For reasons to be discussed hereinafter, a thermal insulating sleeve or jacket 28 is disposed around core leg 16 between the latter and coil 24. For the moment, it should suffice to say that this sleeve must be designed to serve as a thermal insulator without interfering with the electrical compatibility of the core and its winding.

In accordance with the present invention, magnetic core 10 is field annealed by means of induction heating.

More specifically, a suitably sized and shaped induction coil 29 shown in FIG. 2 is provided for this purpose. As seen in FIG. 3, the coil 29 which is constructed of copper but may be of any other suitable material is disposed around core/coil assembly 26 in the manner shown in FIG. 3. Coil 29 is excited with an alternating current from a source generally indicated at 30. This creates a field around the entire core/coil assembly causing current to be induced through both the core and coil in a known manner.

Since the resistivity of the core is substantially greater than the resistivity of the coil as indicated previously, the core will heat up to a substantially greater extent than the coil. In this way, the core can be annealed with the coil (or coils) assembled thereto. At the same time, the core must be subjected to a magnetic field during the annealing process in order to develop magnetic anisotropy. This can be readily accomplished by using the coil 24 to generate such a field. Thus, coil 24 is shown including its own excitation source 31.

Obviously, there must be sufficient current induced through the core for a sufficient period of time to heat the core to satisfactory annealing temperatures for a sufficient period of time. The necessary time, for example between 1 and 3 hours, and temperature, for example between 260° C. and 320° C., required for annealing the core will depend upon the specific amorphous metal making up the latter as well as the size and shape of the core. For example, as stated previously, the manufacturer of the METGLAS alloy 2605SC recommends that this particular material be annealed by subjecting it to a temperature of 365° C. for two hours in argon, a vacuum or dry nitrogen. They also recommend that the core be cooled at a rate of 2° C. per minute. These parameters are recommended under the assumption that the core is to be heated in a resistance heated furnace. Applicants have found on the other hand that the outer core temperature lags behind the inner core temperature by a substantial amount, for example as much as 60° C. As a result, it has been found necessary to reduce the annealing temperature from the value recommended since for practical reasons the temperature of the core is monitored at its outer surface. The exact annealing temperature used and the time during which the core is subjected to this temperature will of course depend upon its particular amorphous metal, its shape, design and size as indicated above. For example, it has been found that for a one-half pound core from METGLAS alloy 2605SC a suitable temperature range for annealing purposes is from 260° C. to 320° C., as measured at its outer surface. Obviously, in order to provide a temperature within this range, an associated level of current must be induced through the core which, in turn, depends upon the magnetic field produced as a result of the excitation of coil 29. In the specific example just recited, it was found that a field of 10 Oe produced as a result of exciting coil 29 induced the appropriate amount of current. However, again, the various induction and annealing parameters, that is, field strength, induced current level and temperature values will depend upon the core and coil parameters, that is, size, shape and design of the core as well as size, shape and design of the coil being excited.

With one possible exception, there is no fear that the induced heat radiating from core 10 or from coil 24 will cause damage to the insulation around coil 24 so long as the induced temperature is kept within the annealing range. The one exception to this is at the points along the coil in direct confronting relationship with and adjacent to the core. In order to eliminate this problem, the previously described sleeve 28 is disposed between these points and the adjacent core section, as illustrated in FIG. 1 and serves as a thermal insulating barrier. In this way, there is no possibility of damaging any of the insulation of the coil. The particular material making up sleeve 28 may be of any suitable type so long as it performs the intended purpose and does not otherwise affect operation of the core and coil. One suitable material is NOMEX paper from DuPont Company or FIBERFRAX paper from Carborundum Company. Obviously its thickness will depend upon the overall parameters of the core/coil assembly and temperature but could be readily provided.

In order to control the annealing temperature of core 10, the previously mentioned source of power 30 is controlled by suitable control means generally indicated at 32 and one or more thermal couples 34 located at the external surface of the core. The thermal couple or thermal couples monitor the temperature of the outer core. The control means 32 which may be readily provided responds to these temperatures for controlling the power supplied to coil 29 from source 30 for maintaining the core temperature at the desired level.

Attention is now directed to a preferred way in which the overall core and its associated coil (or coils when two or more are used) are assembled and subsequently annealed. While not shown, a continuous strip of the amorphous metal making up core 10 is formed into a generally closed-loop shape, for example a square or rectangular shape around an appropriate support surface (not shown) in a conventional manner. The core is then formed into its ultimate shape illustrated best in FIG. 1 by conventional means (not shown) and provided with or without a joint, again in a conventional way. If, for example, a joint is provided, it can be made by cutting transversely across a section of the core. In either case, before the core is annealed and while it still displays sufficient ductility and flexibility, the coil or coils and their associated thermal insulating sleeves are assembled around the core. If a joint is used, it is used to gain access around the core for positioning the coil (or coils). If a joint is not used, the coil or coils and thermal insulation can be wound around corresponding sections of the core.

What is claimed is:

1. In an electrical transformer including a core initially formed from a continuous strip of amorphous metal wound about itself to form a closed-loop and at least one insulation coated transformer coil located around one circumferential section of said core, the material making up said coil being selected to have substantially lower electrical resistivity than said amorphous metal core, a method of annealing said core after said transformer coil has been positioned around said core section, said method comprising the step of placing said core and transformer coil in close proximity to an induction coil, exciting said induction coil with an alternating current for inducing current through said core and transformer coil to heat the core to satisfactory annealing temperatures for a period of time sufficient to anneal said core without heating said transformer coil to a temperature sufficient to damage its insulation coating during said period of time.

2. A method according to claim 1 wherein said annealing temperature is between 260° C. and 320° C. at the outer core when the latter is a one-half pound core wound from 2605SC METGLAS material.

3. A method according to claim 2 wherein said period of time is between 1 and 3 hours.

4. A method according to claim 1, including the step of exciting said transformer coil around said core for producing a magnetic field during the time said induction coil is excited sufficient to develop magnetic anisotropy in said core.

5. A method according to claim 1 including the step of thermally insulating said transformer coil including its insulation coating from said core sufficient to prevent heat from the core from damaging said insulation coating.

6. In an electrical transformer including an amorphous metal core having a closed-loop shape and an insulator coated transformer coil located around one section of said core, the material making up said coil being selected to have substantially lower electrical resistivity than said amorphous metal core, a method of forming and annealing said core comprising the steps of winding a continuous strip of flexible, non-annealed amorphous metal into said closed-loop shape core, cutting said core across a circumferential section prior to annealing thereof whereby to gain access to said one core section for positioning said insulation coated transformer coil around said one section, thereafter positioning said insulation coated transformer coil around said one section, with a layer of thermal insulation directly therebetween, and subsequently placing said core and transformer coil within an induction coil and exciting said induction coil with an alternating current for inducing currents through said core to heat the latter to a satisfactory annealing temperature for a period of time sufficient to anneal said core without heating said transformer coil to a temperature sufficient to damage its insulation coating during said period of time and without causing the heat from the core to damage the immediately adjacent insulation coating.

7. A method according to claim 6 including the step of exciting said transformer coil for producing a magnetic field during the time said induction coil is excited sufficient to develop magnetic anisotropy in said core.

* * * * *